US007551606B2

(12) United States Patent
Iwamura

(10) Patent No.: US 7,551,606 B2
(45) Date of Patent: Jun. 23, 2009

(54) ISOCHRONOUS TRANSMISSION FOR IP-ORIENTED NETWORK

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 730 days.

(21) Appl. No.: 11/045,735

(22) Filed: Jan. 28, 2005

(65) Prior Publication Data

US 2006/0039398 A1 Feb. 23, 2006

Related U.S. Application Data

(60) Provisional application No. 60/603,485, filed on Aug. 20, 2004.

(51) Int. Cl.
*H04L 12/66* (2006.01)

(52) U.S. Cl. ....................... 370/352; 370/353; 370/389; 370/392; 725/105

(58) Field of Classification Search ................. 370/232, 370/442, 351–356, 389, 392; 725/151, 79, 725/105, 109
See application file for complete search history.

(56) References Cited

U.S. PATENT DOCUMENTS 6,378,000 B1 4/2002 Akatsu et al.
6,496,509 B1 12/2002 Fant
6,587,453 B1 7/2003 Romans et al.
6,760,797 B1 7/2004 Kim
6,791,996 B1 * 9/2004 Watanabe et al. ........... 370/447
6,813,282 B1 * 11/2004 Domon ....................... 370/516
6,820,150 B1 11/2004 Joy et al.
2002/0120740 A1 8/2002 Ho et al.

(Continued)

FOREIGN PATENT DOCUMENTS

JP 2001160813 A2 6/2001

OTHER PUBLICATIONS

Lee et al., "HomePlug 1.0 Powerline Communication LANs—Protocol Description and Performance Results version 5.4", International Journal of Communication Systems, Sep. 2002, pp. 1-21.*

(Continued)

*Primary Examiner*—Wing F Chan
*Assistant Examiner*—Matthew Campbell
(74) *Attorney, Agent, or Firm*—John P. O'Banion

(57) ABSTRACT

A method and apparatus for communicating streaming data, such as audio and video streams, isochronously over a network. The invention may be utilized with power-line communication (PLC) networks or other IP-based networks. Hardware is configured for packetizing the streaming data, such as MPEG streaming data, which is communicated at the IP physical layer within a contention-free period within each communication cycle. A reservation mechanism utilizes back-offs to allow a single transmitter to reserve a slot for isochronous communication of a given stream of data. A processing element handles packetizing only for asynchronous communication of data within the remaining portion of each communication cycle which is referred to as a contention period, as a number of transmitters may vie for communication during that interval. Addressing for the isochronous communication is performed with MAC addressing instead of IP addressing. Existing IP stack and protocols can be reused for upper layer control mechanisms.

16 Claims, 16 Drawing Sheets

U.S. PATENT DOCUMENTS

2004/0101288 A1* 5/2004 Ohnishi ...................... 386/124
2004/0151153 A1 8/2004 Henry et al.
2004/0153565 A1 8/2004 Bloch et al.
2004/0170182 A1 9/2004 Higashida et al.
2004/0223487 A1 11/2004 Ejzak et al.
2005/0002373 A1 1/2005 Watanabe et al.
2005/0177860 A1* 8/2005 Goyal et al. ................ 725/118
2006/0112272 A1* 5/2006 Morioka et al. ............. 713/171

OTHER PUBLICATIONS

International Electrotechnical Commission, "Consumer audio/video equipment-Digital interface- Part 4: MPEG2-TS data transmission", IEC First edition, Feb. 1998, Reference No. 61883-4, pp. 5-23.*

IEEE std 802.3-1985, "IEEE standards for local area networks: carrier sense multiple access with collision detection (CSMA/CD) access method and physical layer specifications", 1985, pp. 23-27.*

* cited by examiner

| Component Name | Abbreviation | Description |
|---|---|---|
| Data Length | data_length | Length can be any value from zero to all ones (FFFFh). When the data length is not a multiple of four bytes, then the talker must pad the last quadlet field with zeros. |
| Isoch Data Format Tag | tag | The value of OOb indicates that the isochronous data is unformatted. All other values are reserved. |
| Isoch Channel Number | Channel | Specifies the isochronous channel number assigned to this packet. Channel numbers are a simplified means of addressing. Channel numbers are assigned to a node for talking or listening. |
| Transaction code | tcode | The transaction code for an isochronous data block transaction is Ah. |
| Synchronization Code | sy | Application specific. |
| Header CRC | header_CRC | CRC value for header. |
| Data Block Payload | data_field | Data to be transferred by the talker. Last quadlet of data field must be padded with zeros if necessary. |
| Data Block CRC | data_CRC | CRC value for the data field. |

FIG. 6
(Prior Art)

| FMT ID | Format ID | Description |
|---|---|---|
| SID | Source node ID | |
| DBS | Data Block Size | 110B (6 quadlets = 24 bytes) |
| FN | Fraction Number | 11B (1 Source packet = 8 data block) |
| QPC | Quadlet Padding Count | 0B (No padding) |
| SPH | Source Packet Header | 1 (with source packet header) |
| Rsv | Reserved | – – |
| DBC | Data Block Count | cyclic |
| FMT | Format ID | 100000B (MPEG -TS) |
| FDF | Format Dependent Field | (i.e. Sync Time) |

FIG. 7
(Prior Art)

| FMT ID | Format ID | Description |
|---|---|---|
| DBS | Data Block Size | 64, 96 or 192 bytes |
| DBC | Data Block Count | Continuity counter to find datablock discontinuity |
| FN | Fraction Number | DBS bytes: {3=64, 2=96, 1=192} |
| DBN | Data Block Number | Data Block Number in a bus packet |

FIG. 10

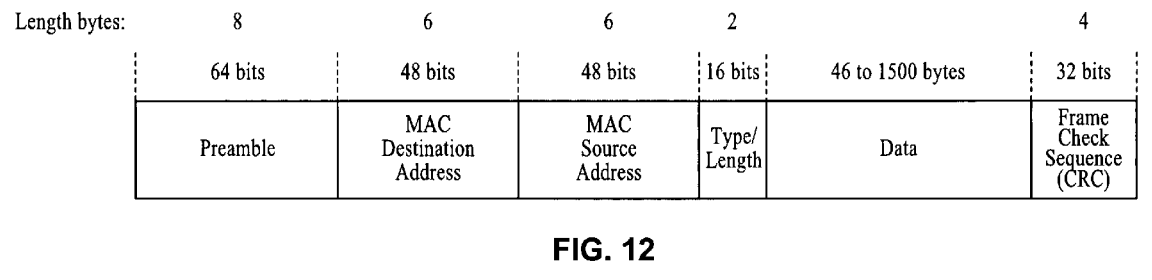

| Length bytes: | 8 | 6 | 6 | 2 | | 4 |
|---|---|---|---|---|---|---|
| | 64 bits | 48 bits | 48 bits | 16 bits | 46 to 1500 bytes | 32 bits |
| | Preamble | MAC Destination Address | MAC Source Address | Type/ Length | Data | Frame Check Sequence (CRC) |

FIG. 12

ISOCHRONOUS TRANSMISSION FOR IP-ORIENTED NETWORK

CROSS-REFERENCE TO RELATED APPLICATIONS

This application claims priority from U.S. provisional application Ser. No. 60/603,485 filed on Aug. 20, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to internet protocol (IP) oriented communication networks, and more particularly to an isochronous protocol for use with IP-based networks.

2. Description of Related Art

Audio and/or video (AV) streams are often transmitted from the server to the client over any of a number of networks, such as Ethernet, wireless (IEEE 802.11, etc.) and power line communication (PLC) networks (i.e. HomePlug™). These networks are typically IP based and have a protocol stack such as shown in FIG. 1. The left portion of the figure illustrates an open systems interconnect (OSI) 7-layer model. The right portion of the figure depicts the actual protocol stack when an AV stream is communicated over Ethernet.

First, the MPEG-TS (Motion Picture Experts Group-Transport Stream) is packetized as based on RTP (Real-time transport protocol). RTCP (RTP Control Protocol) is mainly utilized for providing feedback on transmission condition. RTSP (Real-Time Streaming Protocol) is utilized by the client for sending the server a control command (i.e. stop, fast forward, and so forth). RTP and RTCP packets are packetized according to UDP (User Datagram Protocol). RTSP is packetized with TCP (Transmission Control Protocol). All the results are handled with IP (Internet Protocol). The IP packet is sent to the Ethernet MAC (Media Access Control) layer and then Ethernet Physical layer for transmission. The server performs the packetizing process. On the receiver (client) side, data is unpacketized in the reverse direction, as shown in FIG. 2.

The current IP stack for AV streaming has a number of problems, including redundancy. It should be noted that most digital broadcast programs use MPEG-TS in which the MPEG-TS packet is repeatedly wrapped with protocols such as RTP, UDP and IP. Each of these protocols has its own header and a significant level of overhead. Another drawback is that the overhead intensive packetizing is performed by the software, which is a slow process and a process whose speed depends on host processor loading. The configuration of the host bus is often another substantial issue that must be addressed. It should be appreciated that the time-critical nature of the AV stream is not fully amenable to slow execution by a software process.

Usually the AV stream is sent from one hardware block to another hardware block (i.e. memory to Ethernet interface) over the PCI bus. Although the PCI bus provides high bandwidth, bus communications must still wait while the PCI bus is busy, which leads to unpredictable delays. Accordingly, the existing IP stack mechanisms are not well-suited to the substantially isochronous nature of AV streams. Despite these drawbacks with conventional IP stacks they are often used for communicating AV streams due to their ubiquity.

In contrast to the primarily asynchronous nature of IP-based networks, IEEE 1394 network standards arose that were directed primarily toward AV applications. IEEE 1394 is capable of operating in two communication modes, asynchronous and isochronous. The non-time critical data and general data transfer is handled by the asynchronous transmissions, while time-critical data, such as AV streams and the like, are sent in an isochronous mode.

FIG. 3 depicts a block diagram of a conventional IEEE 1394 network in which asynchronous data is sent to the transaction layer first and then to the link layer, while the isochronous data is sent directly to the link layer.

FIG. 4-7 depicts the packetizing of an MPEG-TS stream for isochronous transmission. In FIG. 4, it is seen that the source packet header (4 bytes) is attached to each MPEG-TS packet of 188 bytes. The source packet header includes a 25-bit timestamp. Each packet is time-stamped with the time it arrives at the link layer, actually, at the transport interface of the IEEE 1394 hardware, and is split into several data blocks.

FIG. 5A depicts the structure of a bus packet according to the IEEE 1394 configuration. One or more data blocks are repacketized into one bus packet to fit the assigned time slot. CIP (Common Isochronous Packet) header and the isochronous packet header are attached to each bus packet, which include the minimum essential information for conveying an isochronous transmission. On the receiver side the packet is unpacketized in the reverse order, with data blocks being combined to rebuild the original MPEG-TS packet. The packet is output from the IEEE1394 hardware in response to its timestamp. It should be appreciated that the isochronous format provides less redundancy than the IP-based protocol.

FIG. 6 is a mapping of the header fields within the bus packet according to the IEEE 1394 configuration as exemplified in FIG. 5A.

FIG. 7 is a mapping of the fields within the CIP header according to the IEEE 1394 configuration as exemplified in FIG. 5B.

Figure 1:
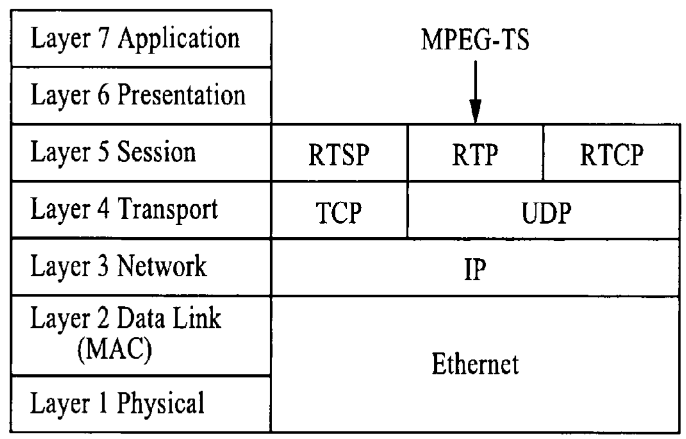

Although the IEEE 1394 network provided a number of benefits it has not been widely adopted, with the overwhelming bulk of the market remaining tied to IP-networking. In addition, the most popular middle and application layers are those built for use on IP-networks and not IEEE 1394 networks, such as UPnP (Universal Plug and Play) and DLNA (Digital Living Network Alliance).

Accordingly, a need exists for a system and method of efficiently supporting isochronous communication within an IP-based network. These needs and others are met within the present invention, which overcomes the deficiencies of previously developed packet-based digital communication standards.

BRIEF SUMMARY OF THE INVENTION

The invention provides an apparatus and method for isochronously communicating streaming data (i.e. AV streams) over an IP-based network, such as a power-line communications (PLC) network. The communication provides highly efficient transfer of streaming data, such as audio and video data streams (AV), between devices coupled to an IP-based network. The communication cycles of the network are divided into a contention-free portion within which isochronous communication is performed, while the remainder of the cycle is used for supporting asynchronous communication. Isochronous communication according to the invention is performed by hardware at the physical layer which packetizes the streaming data, and communicates it over time slots within the contention-free portion(s) of the cycle. The isochronous communication mechanisms of the present invention are compatible with existing data structures for communicating isochronous data packets. The asynchronous communication is preferably still handled by a microprocessor which performs packetization and communication in response to software executing layers of the IP protocol.

The present method and system for performing isochronous communications over an IP-based network is amenable to embodiment in a number of alternative forms, including but not limited to the following.

An embodiment of the present invention describes an apparatus for communicating data streams isochronously over an Internet protocol (IP) based network, comprising: (a) means for packetizing or depacketizing streaming data within the physical layer of the IP-based network as communicated during a contention-free period within a communication cycle; and (b) a control circuit configured for packetizing or depacketizing asynchronous data as communicated during the remaining portion, contention period, of the communication cycle. The means for packetizing streaming data preferably comprises a hardware circuit configured for receiving streaming data, encoding the data into a packet format, and packetizing the streaming data into isochronous data packets. The means for packetizing streaming data is also preferably configured to reserve a slot in the contention-free period for communication of the streaming data, wherein no other transmitter can contend for the reserved slot until it has been released. The control circuit preferably comprises a microprocessor, or other programmable element, configured for executing programming for receiving and controlling the packetizing and depacketizing of asynchronous data to, or from, the contention period within the communication cycle.

An embodiment of the present invention can also be described as an apparatus for communicating data streams isochronously over an Internet protocol (IP) network (i.e. power-line communications (PLC) network), comprising: (a) a framing circuit configured for detecting beacon signals on the network in response to (i.e. which are indicative of) sequential communication cycles; (b) an encoder configured for receiving streaming data (MPEG) and encoding the streaming data into a digital packet-based format; (c) an interface circuit configured for receiving encoded packets from the encoder and packetizing the data for isochronous transmission within a contention-free period within the communication cycles; and (d) a controller circuit configured for packetizing received asynchronous data for communication within a contention period within the communication cycles. The streaming data being communicated preferably comprises streaming audio data, visual data, or a combination of audio and visual data. It will be appreciated that communicating these in an isochronous manner allows providing assurances as to quality of service (QoS) to be maintained. The invention divides the processing between hardware for the isochronous communications and software for the less time critical asynchronous communication. The controller circuit for handling the asynchronous communication preferably comprises a microprocessor, microcontroller, or similar programmable data element configured for executing programming for receiving and controlling the packetizing and depacketizing of asynchronous data to, or from, a contention period within the communication cycle.

An embodiment of the present invention can also be described as a method of communicating streaming data isochronously over an Internet protocol (IP) network, comprising: (a) marking sequential communication cycles on an IP-based network with a beacon signal; (b) dividing each sequential communication cycle into a contention-free period and a contention period; (c) packetizing incoming streaming data into sequential isochronous data packets; (d) detecting an available time slot in the contention-free period; (e) reserving the available time slot for communicating the sequential isochronous data packets; (f) generating MAC addressing for the isochronous communication; (g) transmitting a data stream within the available time slot; and (h) receiving the data stream within the available time slot, such as at a destination device.

The marking of sequential communication cycles is preferably performed by a device coupled to the network which operates as a bus master, such as a device which operates as a principle server for the network. The contention-free period is configured to either have a predetermined length or configured to provide a variable length which is established by a bus master device which signals the length of the contention-free period. The use of a variable length contention-free period allows the network to be adapted to operate more efficiently when the ratio of asynchronous data to isochronous data changes. The end of the variable length contention-free period can be readily established in response to a signal generated by the bus master, therein establishing the length for the variable period. A back-off technique can be utilized if two or more isochronous transmission devices attempt to reserve a given time slot in the contention-free period. For example one such back-off technique comprises a carrier sense multiple access (CSMA) technique.

The present invention provides a number of benefits and advantages, including but not limited to the following aspects.

An aspect of the invention provides methods and apparatus for performing isochronous transmissions over an IP-based network.

Another aspect of the invention is to provide isochronous transmissions over a power line communications (PLC) network which is IP-based.

Another aspect of the invention is to provide isochronous transmissions of AV streams over an IP-based network.

Another aspect of the invention is to provide for isochronous communication over an IP-based network without redundant RTP/UDP/IP packetizing.

Another aspect of the invention is to provide for isochronous communication of MPEG streams over an IP-based network.

Another aspect of the invention is to provide isochronous communication in which isochronous streams are processed by hardware and asynchronous streams processed by software.

Another aspect of the invention is to provide hardware for performing isochronous communication with reduced levels of overhead, delay and jitter in comparison with software based approaches.

Another aspect of the invention is to provide sufficient quality of service (QoS) within isochronous communications to support QoS guarantees.

Another aspect of the invention is to provide isochronous communication that is compatible with readily available Ethernet MAC+PHY.

Another aspect of the invention is to provide isochronous communication within IP-based networks while utilizing existing IP stack and protocols for upper layer control.

Another aspect of the invention is to provide isochronous communication within IP-based networks while utilizing UPnP and DLNA stacks, wherein reuse of the existing protocols saves on development resources as well as system costs.

A still further aspect of the invention is that of providing isochronous communication capability that can be readily incorporated within IP-based infrastructure.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a data schema of a conventional Internet Protocol (IP) protocol stack with an Open Systems Interconnect (OSI) 7-layer model.

Figure 2:
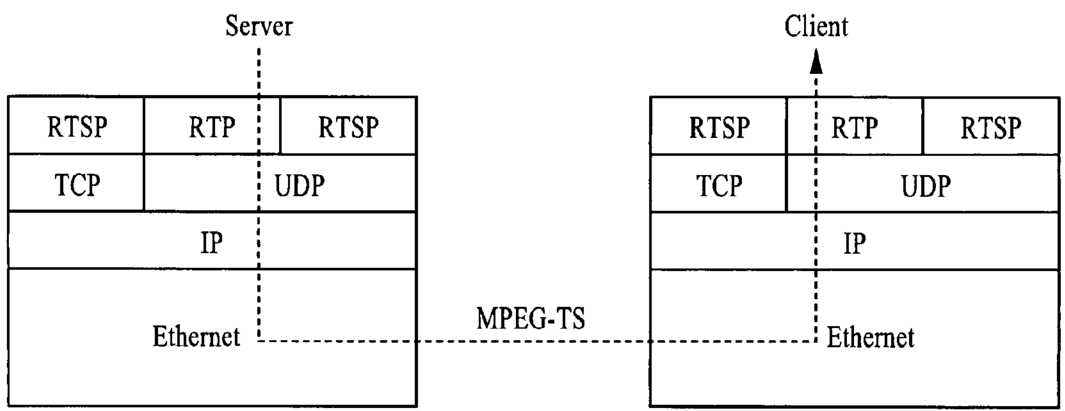

FIG. 2 is a block diagram of conventional communication of streaming data (MPEG-TS) between the IP stacks of a client and server coupled to an IP-based network.

Figure 3:
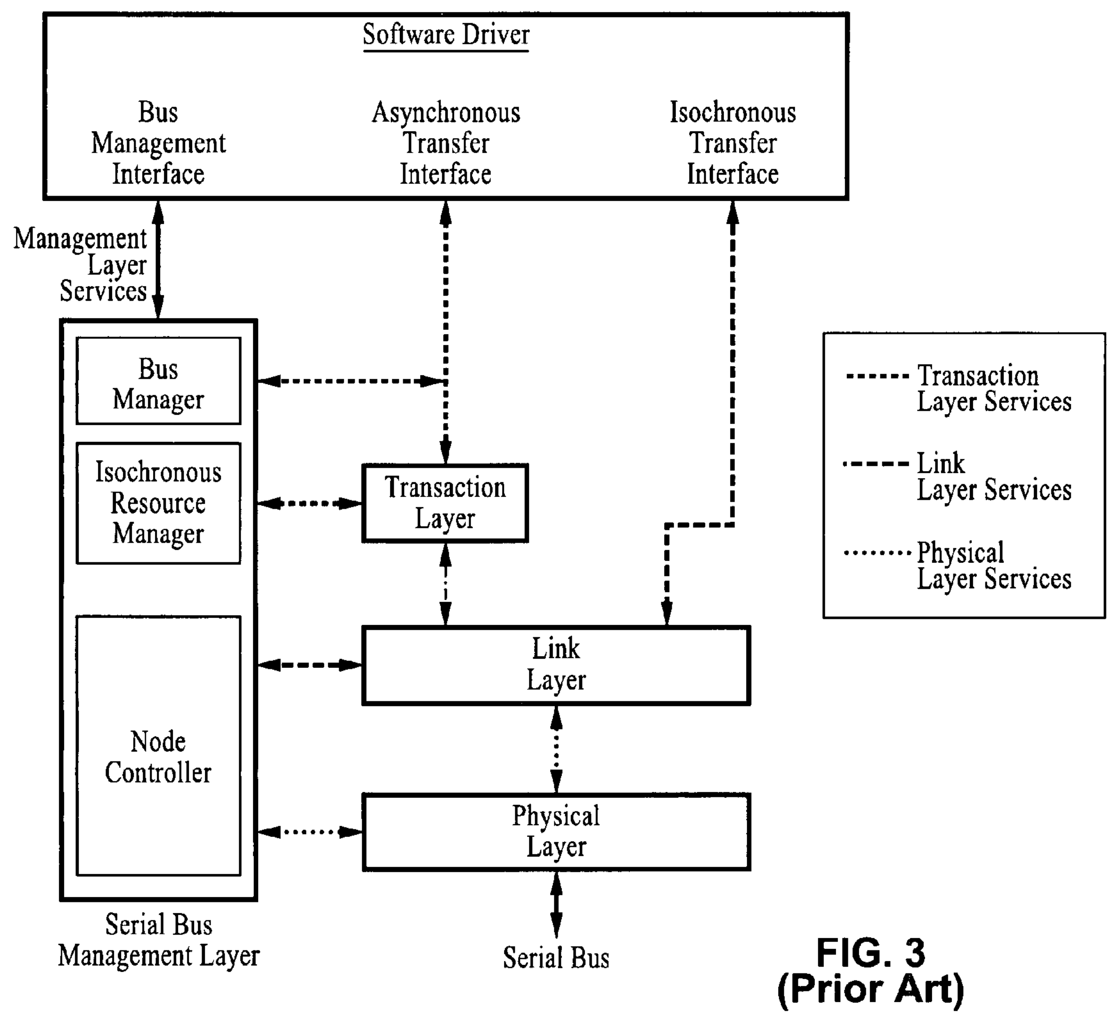

FIG. 3 is a block diagram of communicating asynchronous and isochronous data according to a conventional IEEE 1394 network.

Figure 4:
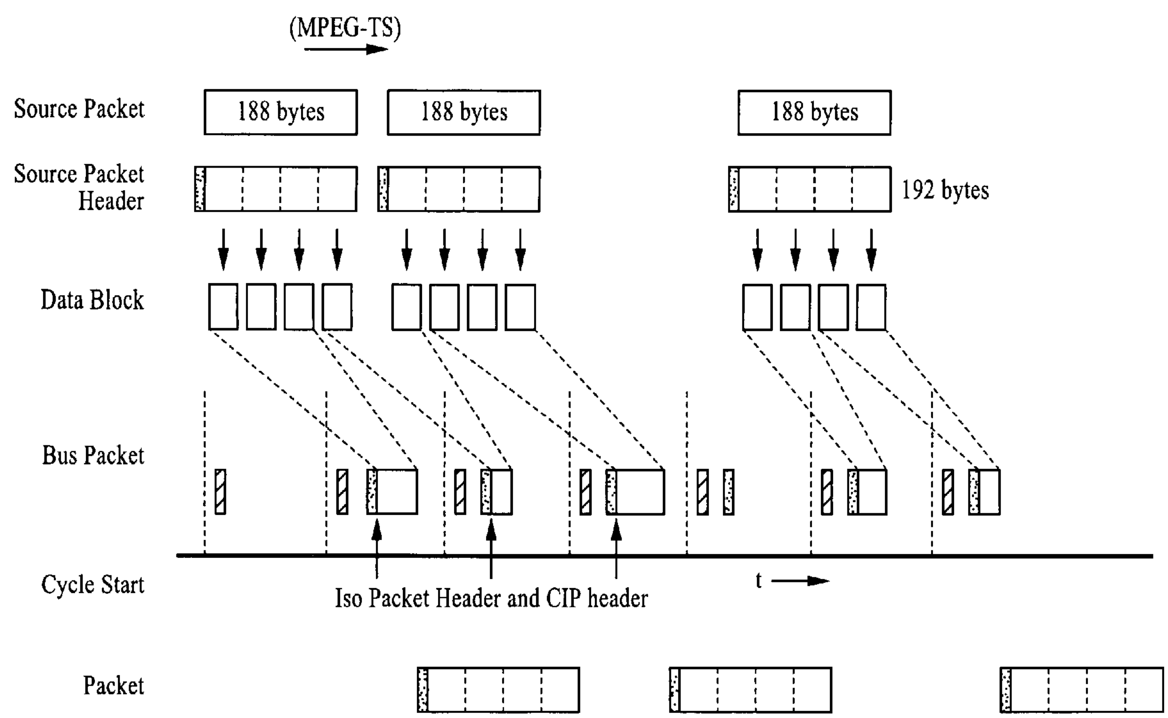

FIG. 4 is a block diagram of a conventional packetizing process for an MPEG stream on an IEEE 1394 network.

Figure 5A:
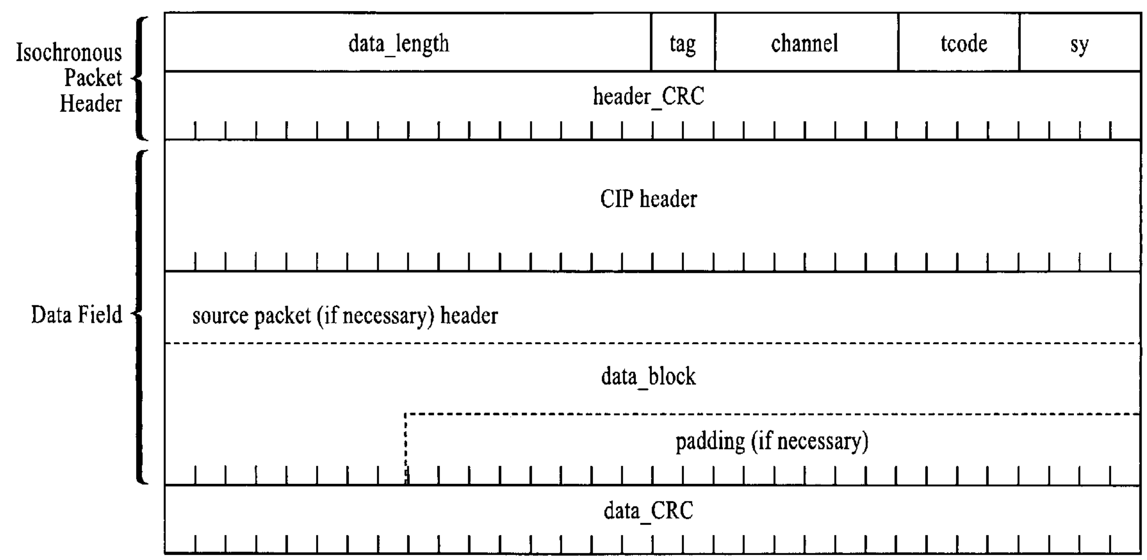
FIG. 5B depicts the structure of the CIP header of a bus packet according to the IEEE 1394 configuration depicted in FIG. 5A, showing the fields SID, DBS, FN, QPC, SPH, DBC, FMT, FDF and optionally SYT.
FIG. 5C depicts the structure of a source packet header of a bus packet according to the IEEE 1394 configuration depicted in FIG. 5A, having a timestamp and reserved bits.

FIG. 5A is a bit-mapped data structure for an isochronous bus packet on an IEEE 1394 network.

Figure 5B:
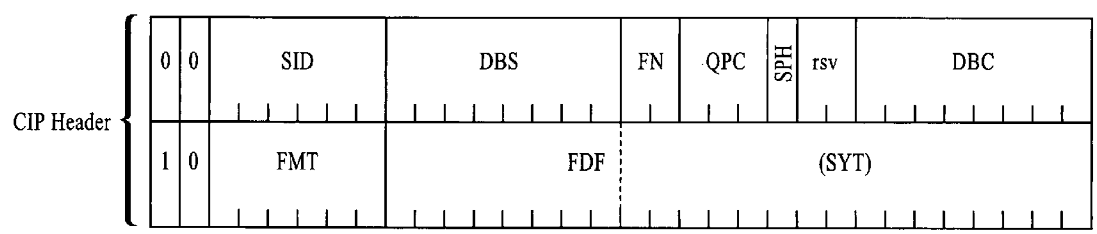

FIG. 5B is a bit-mapped data structure for a CIP header on an IEEE 1394 network.

Figure 5C:
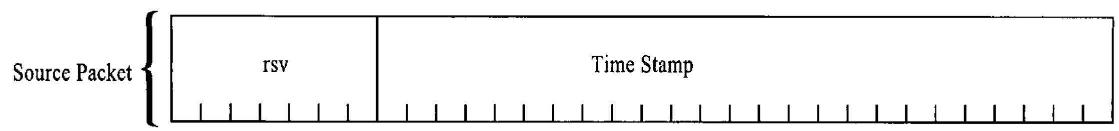

FIG. 5C is a bit-mapped data structure for a source packet header on an IEEE 1394 network.

FIG. 6 is a data field map of the header field within an IEEE 1394 network bus packet.

FIG. 7 is a data field map of the CIP header fields in an IEEE 1394 network.

Figure 8:
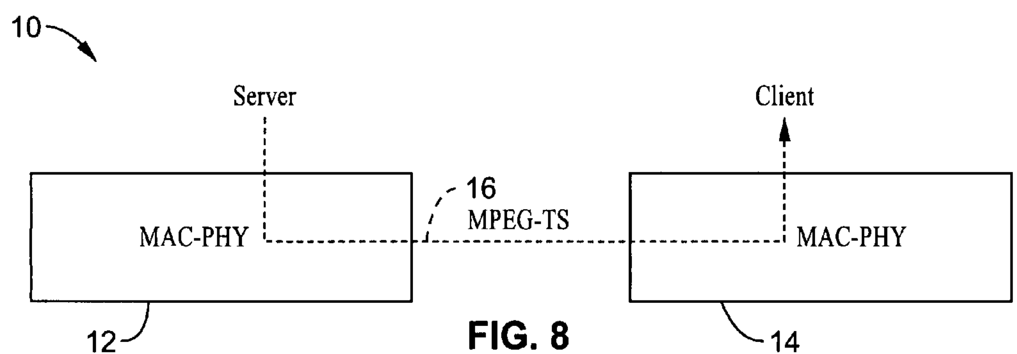

FIG. 8 is a block diagram of streaming data communication between the MAC and physical layers of devices configured for IP-based communication according to an embodiment of the present invention.

Figure 9:
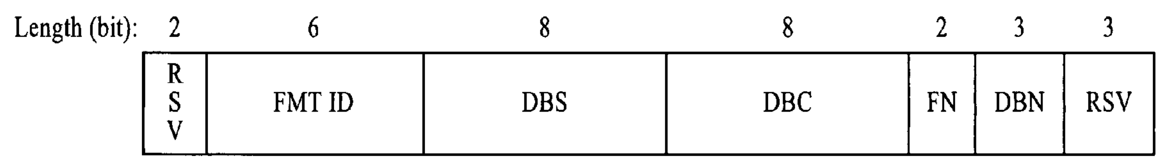

FIG. 9 is a bit-mapped data structure of an isochronous packet header utilized according to an embodiment of the present invention.

FIG. 10 is a data field map of the isochronous packet header shown in FIG. 9.

Figure 11:
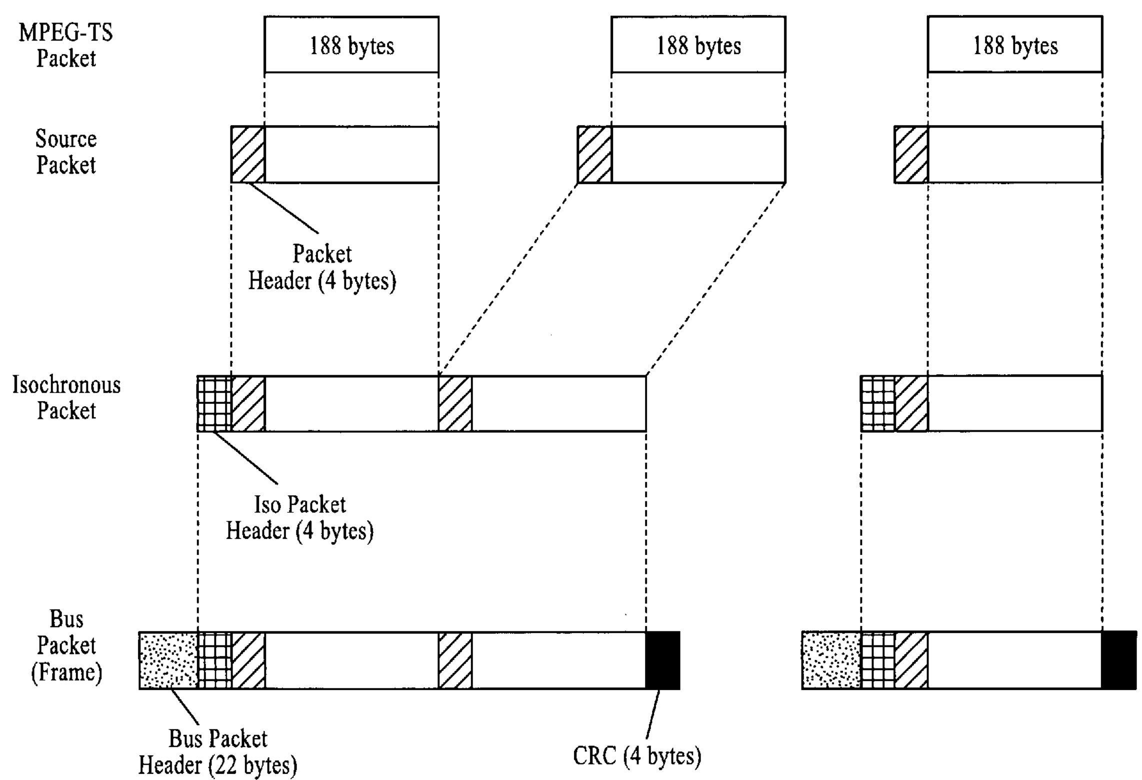

FIG. 11 is a block diagram of a packetizing bus packets according to an embodiment of the present invention, showing MPEG-TS packets formed into source packets, then into isochronous packets, and finally into bus packets.

FIG. 12 is a field-mapped data structure of a bus packet header configured according to an embodiment of the present invention to match an Ethernet frame header.

Figure 13:
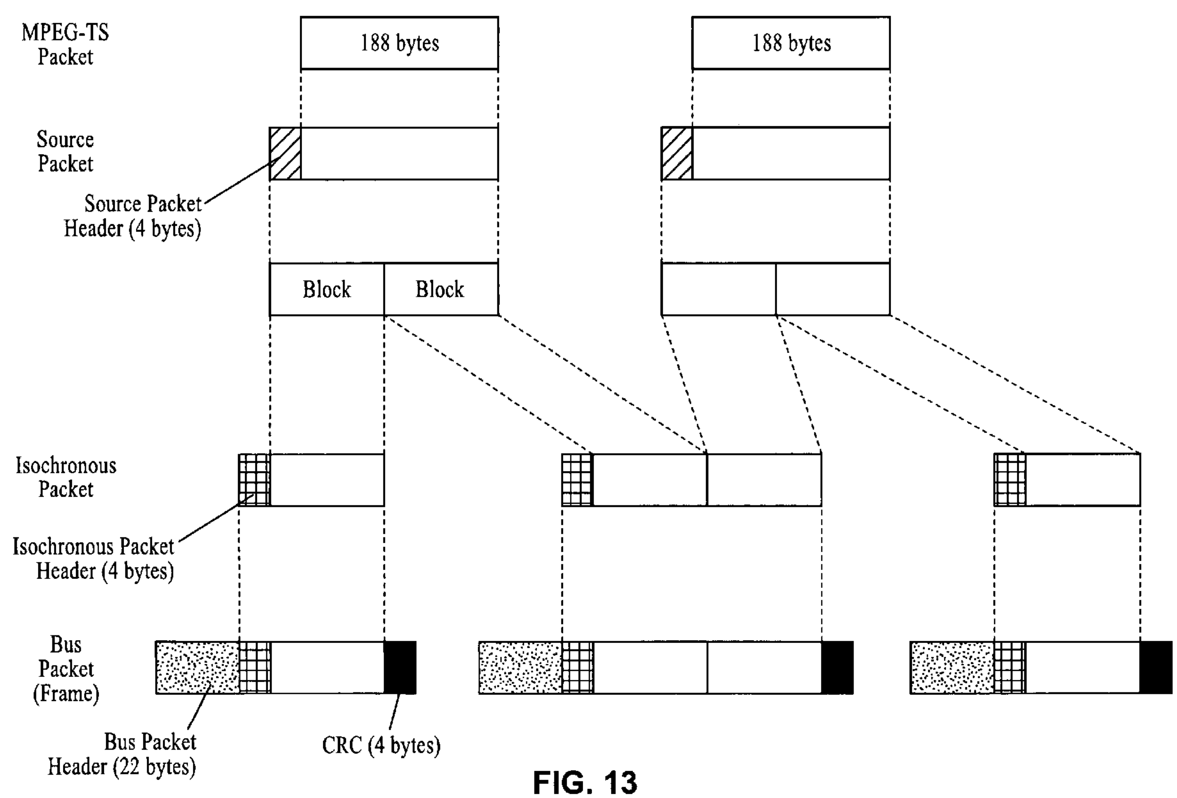

FIG. 13 is a block diagram of packetizing bus packets according to an embodiment of the present invention, showing division of a source packet across multiple blocks.

Figure 14:
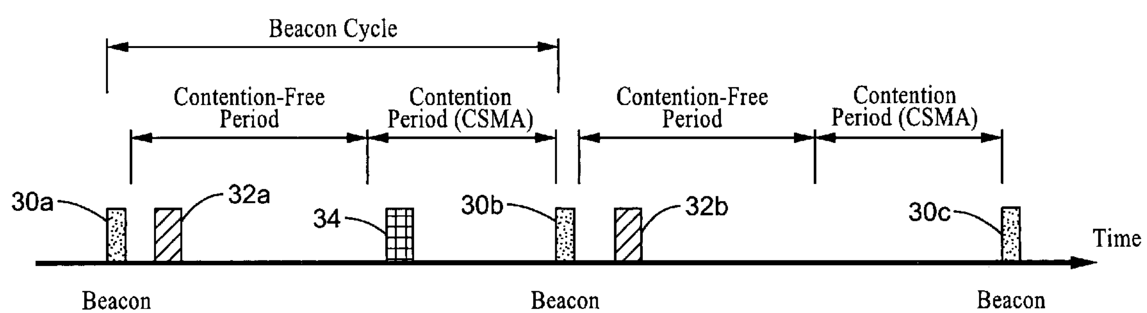

FIG. 14 is a timing diagram of communication cycles according to an embodiment of the present invention, showing contention-free and contention portions within each communication cycle as defined by beacon signals.

Figure 15:
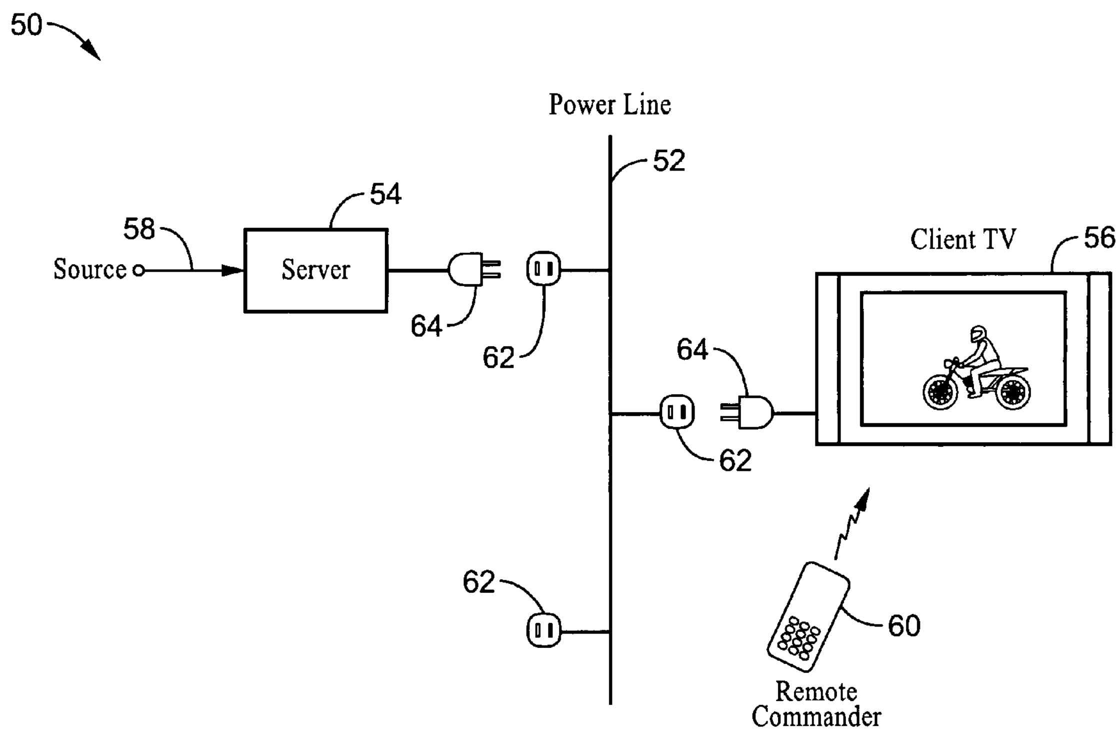

FIG. 15 is a block diagram of a power-line communications (PLC) network according to an embodiment of the present invention, showing a server and client configured for communicating MPEG streams isochronously across the PLC network.

Figure 16:
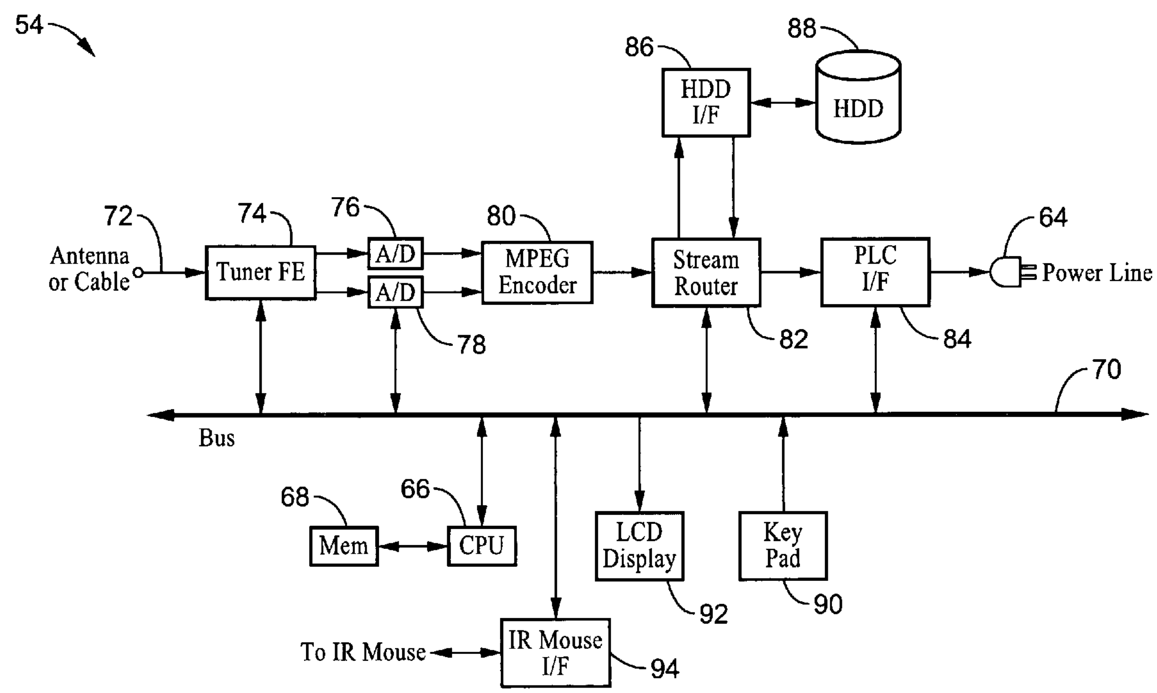

FIG. 16 is a block diagram of circuitry within the server of FIG. 15.

Figure 17:
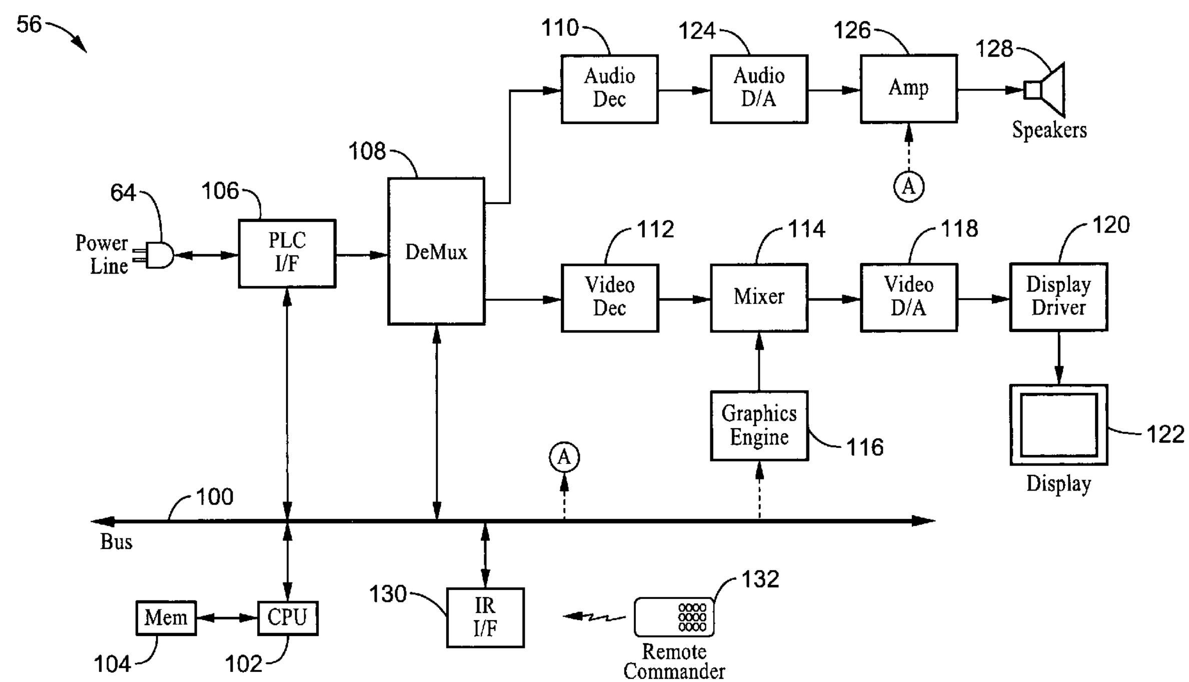

FIG. 17 is a block diagram of circuitry within the client of FIG. 15.

DETAILED DESCRIPTION OF THE INVENTION

Referring more specifically to the drawings, for illustrative purposes the present invention is embodied in the apparatus generally shown in FIG. 8 through FIG. 17. It will be appreciated that the apparatus may vary as to configuration and as to details of the parts, and that the method may vary as to the specific steps and sequence, without departing from the basic concepts as disclosed herein.

The present invention provides apparatus and methods for supporting isochronous communications within an IP-based network. The invention allows the isochronous communications to be readily supported within any IP-based network. Although the discussion primarily centers on an IP-based power line communication (PLC) network, it should be appreciated that the methods and apparatus may be applied generally to other IP-based networks.

FIG. 8 illustrates an embodiment 10 in which communication proceeds between MAC layers 12, 14 which handle the MPEG-TS stream 16 without the use of an IP-stack.

FIG. 9 and FIG. 10 detail the isochronous packet header format within an embodiment of the isochronous transmission format. In one embodiment the packet header comprises four bytes (32 bits) in length (1 quadlet) as shown in FIG. 9. The first two bit areas are reserved for future use. The field FMT ID (6 bits) is utilized to indicate stream format type, such as MPEG-TS. The field DBC (8 bits) is Data Block Count which provides an indication of block continuity, such that a lost block can be found by checking DBC. The field FN (2 bits) is Fraction Number, for example 1, 2, or 3, which by way of example indicates either 192, 94, or 64 bytes, respectively. The field DBN (3 bits) indicates the number of the block in the packet. The last three bits (3 bit) field is also currently reserved for future use. By defining an extension bit in the reserved area, the isochronous packet header may have one or more quadlets, which include for example header CRC (Cyclic Redundancy Check) and other header information.

FIG. 11 illustrates packetizing according to the present invention by way of example when DBS is 192 bytes and FN is 1. In this case the MPEG-TS packet is not split to smaller blocks. A Source Packet Header (4 bytes) includes by way of example a 25 bit timestamp value, which can be formatted to match, or be similar, to the IEEE 1394 source packet header shown in FIG. 5C. It will be appreciated that the source packet header, as well as other packet structures according to the present invention, can utilize any desired format. It should also be appreciated, however, that by conforming to some existing packet standards, such as according to IEEE 1394, portions of the programming for the communication protocol can often be reused to reduce development efforts.

An isochronous packet includes the Isochronous Packet Header and one or more source packets of 192 bytes in length. The DBN of the left isochronous packet depicted in FIG. 10 is two (2) because the isochronous packet has two blocks. It should be appreciated that a block is equivalent to a single MPEG-TS packet for this case. The DBN of the right isochronous packet is one (1). If field DBC of the left packet is n, then DBC of the following packet is n+2. A Bus Packet (frame) consists of a Bus Packet Header, an isochronous packet and four byte (4 byte) CRC (Cyclic Redundancy Check) code.

FIG. 12 illustrates by way of example the Bus Packet Header being configured the same as the Ethernet frame header (22 bytes). The Bus Packet Header in this case has a 64 bit preamble, 48 bit destination MAC address and 16 bit type/length information. The four byte CRC is placed as Frame Check Sequence (FCS) at the end of the bus packet. It should be noted that instead of an IP address, a MAC address is used to identify the source or destination. As will be described in greater detail later in the specification, each MAC address is uniquely associated to its IP address with Address Resolution Protocol (ARP). The payload field includes one or more isochronous packets, with the maximum Ethernet payload length being 1500 bytes. The bus packet includes up to seven (7) isochronous packets ((192×7)+4 bytes).

FIG. 13 illustrates a case of two (2) blocks (DBS is 96 bytes and FN is 2). It should be appreciated that when a PLC network is busy and an access time slot provides insufficient length, then the source packet may be divided into multiple blocks. An isochronous packet includes a header and one or more blocks. In FIG. 12 the field DBN has a value of 1and DBC is n for the left isochronous packet. DBN has a value of 2 and DBC is n+1 for the middle packet, while DBN is 1 and DBC is n+3 for the right packet. A bus packet header and CRC are attached to each isochronous packet as explained previously. The short bus packet makes short time slot usage efficient.

FIG. 14 illustrates by way of example PLC bus access, with the horizontal line depicting the time axis. A beacon master device, typically the server, transmits a cyclic beacon signal (30*a*, 30*b*, 30*c* . . . ) to the power line. A beacon cycle is divided into two parts: (1) a contention-free period, and (2) a contention period. The contention-free period is used for isochronous transmission. Before a new isochronous transmission commences, an available time slot must be detected. When a time slot becomes available it is reserved for every cycle during the streaming transmission. In the figure transmission 32*a* represents an isochronous bus packet (frame) being transmitted within the contention-free period within an available time slot. In a subsequent contention-free period the same time slot is used for transmission 32*b* of the same stream. When the current transmission is completed the time slot is released for another transmission.

If two or more transmissions attempt to obtain the same slot, they attempt retry, preferably according to random back off techniques, such as CSMA (Carrier Sense Multiple Access). IP-based asynchronous communication are performed in the contention period, such as on a CSMA basis as in Ethernet. The figure also shows bus packet 34 associated with an asynchronous communication being communicated during the contention period. Note that for asynchronous transmissions no time slot is guaranteed in the next contention period. The lengths of the contention and contention-free period are either fixed or variable. In case of variable length, a device such as the beacon master, sends a cyclic signal that indicates the end of the contention-free period.

FIG. 15 illustrates an example 50 of a power line communications (PLC) network 52 operating between a server 54 and a client 56, depicted as a television set although various clients can be supported on the PLC network. Server 54 receives a signal from a programming source 58, which for example may comprise an antenna, cable network, satellite network, removable/fixed media player, camera/camcorder, and so forth. In this embodiment server 54 is also configured to receive a remote command (i.e. channel selection, source stream configuration and options, and so forth) from a remote commander 60, for example either directly or more preferably as received through client television set 56. Server 54 sends and receives AV streams over power line communications (PLC) network 52 upon which a plurality of receptacles 62 are provided into which power plugs 64 from devices which are configured to draw power from the power line, and which also may be configured for communication over a PLC network, allowing them to interact with server 54, client 56 or other devices coupled to the power line network.

FIG. 16 illustrates an example embodiment of the circuitry within server 54. The circuit is depicted as comprising a computer processor 66 with memory 68 (i.e. data memory, program memory, removable or fixed memory media, etc.) which communicate with a number of input and output devices through a bus 70. A source coupling 72 is depicted, such as an antenna, cable, or satellite for inputting a signal to the front end of a tuner frontend (FE) 74 which tunes and demodulates the signal. The video output from tuner FE 74 is converted to a digital signal by a signal conversion means, such as by an analog-to-digital converter 76. Similarly, the audio output from tuner FE 74 is converted to digital by a conversion means, such as another analog-to-digital converter 78. These signals are encoded by an encoding means, such an MPEG encoder circuit 80. The encoded result, which comprises an isochronous MPEG transport stream, is sent to PLC interface 84 through a stream router 82. PLC interface 84 performs packetizing of the isochronous packets as previously described. It will be appreciated that within this embodiment the packetizing is performed by hardware which can be a significantly faster process that packetizing performed by software. The hardware packetizing also exhibits almost no delay or jitter. The transport stream is sent by PLC interface 84 through the power plug 64 to the PLC network for receipt by other devices.

The MPEG transport stream may be recorded in a storage means, such as within a memory or more preferably a media. By way of example the transport stream is depicted as being stored on a hard-disk drive 88 controlled through hard-disk drive interface 86. A playback stream from hard-disk drive 88 is sent to stream router 82 through the hard-disk drive interface 86. The playback stream can be distributed through PLC interface 84 onto the PLC network through plug 64. It should also be appreciated that PLC device 54 can also be adapted for receiving content over the PLC network through PLC interface 84 for recording on HDD 88 by way of hard-disk drive interface 86.

Any desired form of user interfacing may be provided, such as exemplified by keypad 90 utilized in conjunction with display 92. Keypad 90 sends input data to CPU 66 through bus 70, while output from CPU 66 can be displayed on LCD display 92 (i.e. input confirmations, tuning status, network status, error messages, parameter settings, etc.). It should be appreciated that the interface circuitry for the keypad and display are not shown, and that the system may utilize alternative or additional forms of input and output without departing from the teachings of the present invention.

In contrast with the hardware-based packetizing of the isochronous streams, packetizing of the asynchronous data is performed by CPU 66 into IP-based asynchronous data packets which are sent to PLC interface 84. The asynchronous data is sent to the destination during the contention period within each communication cycle as already described. CPU 66 also is configured for depacketizing the incoming asynchronous data received through PLC interface 84. A means of wireless communication may also be coupled to server 54 for controlling additional equipment. By way of example this embodiment includes an infrared (IR) interface 94 configured for allowing server 54 to communicate with equipment which can be controlled using IR signals, such as video recorders, camcorders, set top boxes, and so forth.

FIG. 17 illustrates an example embodiment of a client device 56 configured for outputting the streaming data received from server 54. A CPU 102 and memory 104 are configured for controlling various elements coupled to bus 100. A PLC interface 106 depacketizes the incoming isochronous stream, such as from server 54 of FIG. 16. The output from PLC interface 106 is demultiplexed in demultiplexor 108 and sent to audio decoder 110 and video decoder 112.

Video data is mixed within mixer 114 with data from graphics engine 116 with the result being converted to analog signals within video digital-to-analog (D/A) converter 118. The graphics engine may be controlled by CPU 102 over bus 100. The analog signal is received by a display driver 120 for display on video display 122. It should be appreciated that if the display driver is configured for receiving digital control signals that the D/A conversion need not be performed.

The decoded audio signal from audio decoder 110 is converted to digital by an audio digital-to-analog (D/A) converter 124 amplified by amplifier 126, which is optionally controlled by CPU 102, and output to audio transducer 128 (i.e. speaker, or speakers). Preferably the audio portion is configured for reproducing at least two audio channels to provide a stereo output having a right and left channel. Surround sound may be optionally adapted by providing additional audio signal processing and output. It should also be appreciated that class-D amplification may be utilized, wherein the audio signal is not converted to an analog signal, but instead to a pulse-width modulated (PWM) digital output for controlling an audio transducer.

A means of wireless communication can be provided, such as incorporating an infrared interface 130, which is shown configured for communicating with remote commander 132, or other devices configured for communicating over the IR channel with compatible signals. CPU 102 is also configured so that commands received through IR interface 130 can be communicated over the PLC network with server 54 (FIG. 16), or with other devices coupled to the PLC network.

The software executing on CPU 102 in conjunction with memory 104 controls packetizing and depacketizing of asynchronous data. It will be appreciated that memory 104 preferably comprises program memory as well as data memory (i.e. ROM, FLASH, RAM etc.).

According to the present invention upper layer control is provided by the existing IP stack which performs network management. By way of example and not limitation the IP stack performs: (1) plug/unplug detection of devices, (2) IP address management (DHCP: Dynamic Host Configuration Protocol), (3) address resolution (ARP: Address Resolution Protocol), and (4) authentication and key exchange for content protection and security. It should also be appreciated that UPnP and optionally DLNA may be utilized for providing upper layer control.

The new isochronous protocol according to the present invention does not utilize IP addresses, but instead utilizes MAC addresses. With ARP, each IP address is mapped to an associated MAC address. Therefore, the correct destination MAC address can be obtained in this manner. In addition isochronous transmission is controlled by the IP stack. For example, the following controls are preferably executed through the IP stack: (1) transmission condition feedback for dynamic MPEG encoding rate control, (2) destination control (point-to-point or broadcast), (3) source select (cable, satellite, VCR, etc.), (4) channel select (i.e. channel up/down), (5) VCR-style operation (i.e. play, pause, stop, record, slow speed, fast forward, fast rewind, etc.). It should also be recognized that existing protocols, for example RTSP/RTCP, may be utilized for performing these operations.

It should be appreciated that the present invention is amenable to implementation according to numerous embodiments. By way of example and not limitation a few of these possible variations include the following. The embodiments are not limited to MPEG-TS, and the embodiments are readily applicable for use with MPEG-PS (Program Stream), DV (Digital Video) or other formats. The communication media need not be a PLC network, the techniques are applicable to other wired and wireless network forms. Implementation is not limited to the Ethernet MAC/PHY protocols. The packet structures were shown by way of example, and it will be appreciated by one of ordinary skill in the art that packet header and other sub-packet structures can be adapted as desired without departing from the present teachings. For example, the packet header may have an extra data field for header CRC and other information. To facilitate bridging or routing to another network, the isochronous packet may be IP-packetized, which enables routing yet can increase both delay and jitter.

The apparatus and methods described provide for isochronous transmission over an IP-based network, such as within a PLC network. The present invention provides a number of benefits and is subject to various implementation by one of ordinary skill in the art without departing from the teachings herein.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for communicating isochronous and asynchronous data streams over an Internet protocol (IP) network, comprising:

hardware coupled to a MAC and PHY layer of an IP protocol stack which is configured to directly packetize and depacketize isochronous streaming data without it passing through the layers above the MAC and PHY layers of the protocol stack, and configured with, a framing circuit configured for detecting beacon signals on the network in response to sequential communication cycles, an encoder configured for receiving streaming data from a source and encoding said streaming data into a digital packet-based format, an interface circuit configured for receiving encoded packets from said encoder and packetizing the data for isochronous transmission within a contention-free period within said communication cycles, said encoder configured for utilizing a MAC address to identify source and/or destination instead of an IP address; and a controller circuit configured for packetizing asynchronous data through the IP protocol stack in response to programming executing on a computer processor and which packetizes and depacketizes data for communication during contention periods which comprise remaining portions of said communication cycle that are not established in a contention-free period for communicating packets of isochronous streaming data;

said controller circuit packetizes or depacketizes asynchronous data, wrapped with IP-based protocols, in response to executing an IP protocol stack comprising a physical layer and higher layers including at least the IP network layer;

wherein both isochronous and asynchronous data are transmitted through the same physical transmitter interface.

2. An apparatus as recited in claim 1, wherein said IP-based network comprises a power-line communications (PLC) network.

3. An apparatus as recited in claim 1, wherein said streaming data comprises streaming audio data, video data, or a combination of audio and video data.

4. An apparatus as recited in claim 1, wherein said encoder comprises a Motion Picture Experts Group (MPEG) based encoder.

5. An apparatus as recited in claim 1, wherein said controller circuit comprises a microprocessor configured for executing programming for receiving and controlling the packetizing and depacketizing of asynchronous data to, or from, a contention period within the communication cycle.

6. A method of communicating isochronous streaming data and asynchronous data over an Internet protocol (IP) network, comprising:

processing streaming data for isochronous transmission within a MAC and PHY layer of an IP protocol stack configured to directly packetize and depacketize isochronous streaming data without it passing through the layers above the MAC and PHY layers of the protocol stack utilized for packetizing asynchronous data;

marking sequential communication cycles on an IP-based network with a beacon signal to establish framing within which non-contention cycles communicate streaming data isochronously within an IP network configured for asynchronous communication of packets;

dividing each sequential communication cycle into a contention-free period and a contention period;

packetizing incoming streaming data into sequential isochronous data packets, instead of into asynchronous data packets containing headers from layers above the MAC layer;

detecting an available time slot in the contention-free period;

reserving the available time slot for communicating said sequential isochronous data packets;

generating Media Access Control (MAC) addressing for said isochronous communication;

transmitting said isochronous data packets within said available time slot for receipt by another device coupled to the Internet Protocol (IP) based network; and packetizing and transmitting asynchronous data through the IP protocol stack in response to programming executing on a computer processor for communication during contention periods;

said packetizing and transmitting of asynchronous data wraps the data with IP-based protocols and executes an IP protocol stack comprising a physical layer as well as higher layers which include at least the IP network layer;

wherein both isochronous and asynchronous data are transmitted through the same physical transmitter interface.

7. A method as recited in claim 6, wherein said marking of sequential communication cycles is performed by a device coupled to the network which operates as a bus master.

8. A method as recited in claim 6, wherein said contention-free period has either a predetermined length or has a variable length which is established by a bus master device which signals the length of said contention-free period.

9. A method as recited in claim 8, wherein the end of said variable length contention-free period is established in response to a signal generated by the bus master.

10. A method as recited in claim 6, further comprising the use of a back-off technique if two or more isochronous transmission devices attempt to reserve a given time slot in the contention-free period.

11. A method as recited in claim 10, wherein said back-off technique comprises a carrier sense multiple access (CSMA) technique.

12. A method as recited in claim 6:

wherein a source packet header is attached to each packet of streaming data from the source;

wherein an isochronous packet header is attached to at least one source packet, which has a header, to form an isochronous packet; and wherein a bus packet header is attached to at least one isochronous packet, which has an isochronous header, to form a bus packet.

13. A method as recited in claim 12, wherein said source packet header incorporates a timestamp.

14. A method as recited in claim 12:

wherein said source packet comprises 188 bytes of information;

wherein said source packet header comprises 4 bytes of information;

wherein said isochronous packet header comprises 4 bytes of information; and wherein said bus packet header comprises 22 bytes of information, including Media Access Control (MAC) addressing and a frame check sequence.

15. A method as recited in claim 12, wherein said bus packet header incorporates at least one Media Access Control (MAC) address.

16. A method as recited in claim 6, wherein said IP-based network comprises a power-line communications (PLC) network which is based on the Internet Protocol (IP).

* * * * *